(12) United States Patent
Andersson et al.

(10) Patent No.: US 10,338,776 B2
(45) Date of Patent: Jul. 2, 2019

(54) OPTICAL HEAD MOUNTED DISPLAY, TELEVISION PORTAL MODULE AND METHODS FOR CONTROLLING GRAPHICAL USER INTERFACE

(71) Applicant: Telefonaktiebolaget LM Ericsson (publ), Stockholm (SE)

(72) Inventors: Ola Andersson, Spånga (SE); Narciso Oliveira, Jr., Sao Bernardo do Campo (BR); Pablo Esteban Garay, Madrid (ES); Gabriel Vanegas, Sao Paulo (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 368 days.

(21) Appl. No.: 15/101,032

(22) PCT Filed: Dec. 6, 2013

(86) PCT No.: PCT/SE2013/051467
§ 371 (c)(1),
(2) Date: Jun. 2, 2016

(87) PCT Pub. No.: WO2015/084227
PCT Pub. Date: Jun. 11, 2015

(65) Prior Publication Data
US 2017/0031538 A1 Feb. 2, 2017

(51) Int. Cl.
*G06F 3/048* (2013.01)
*G06F 3/0482* (2013.01)
(Continued)

(52) U.S. Cl.
CPC ......... *G06F 3/0482* (2013.01); *G02B 27/017* (2013.01); *G02B 27/0172* (2013.01);
(Continued)

(58) Field of Classification Search
CPC . G06F 3/01; G06F 3/012; G06F 3/013; G06F 3/048; G06F 3/0481; G06F 3/0482;
(Continued)

(56) References Cited

U.S. PATENT DOCUMENTS 5,517,021 A    5/1996  Kaufman et al.
8,643,951 B1   2/2014  Wheeler et al.
(Continued)

FOREIGN PATENT DOCUMENTS

WO    WO 00/17848 A1      3/2000
WO    WO 2010/057304 A1   5/2010
WO    WO 2010/129679 A1   11/2010

OTHER PUBLICATIONS

International Search Report, Application No. PCT/SE2013/051467, dated Sep. 4, 2014.
(Continued)

*Primary Examiner* — Xiomara L Bautista
(74) *Attorney, Agent, or Firm* — Sage Patent Group

(57) ABSTRACT

An Optical Head Mounted Display (OHMD) and a method therein for controlling a Graphical User Interface (GUI) as well as a television portal module and a method therein for enabling the OHMD to control the GUI displayed by the television portal module. The television portal module displays a GUI element for enabling the OHMD to enter into a mode for controlling the GUI. The OHMD displays, at a display of the OHMD, a sight element for aiming, by the user, at the GUI element. The OHMD enters into a mode for controlling the GUI, when detecting that the sight element is aimed at the GUI element by means of detecting a movement of a head of a user or an eye of a user. The television portal module receives, from the OHMD, a command for controlling the GUI. Corresponding computer programs and computer program products are also disclosed.

29 Claims, 8 Drawing Sheets

(51) Int. Cl.
*G06F 3/0481* (2013.01)
*G02B 27/01* (2006.01)
*G06F 3/01* (2006.01)
*G06F 3/0484* (2013.01)
*H04N 5/44* (2011.01)
*H04N 5/445* (2011.01)
*G06F 1/16* (2006.01)

(52) U.S. Cl.
CPC ......... *G02B 27/0179* (2013.01); *G06F 1/163* (2013.01); *G06F 3/011* (2013.01); *G06F 3/012* (2013.01); *G06F 3/013* (2013.01); *G06F 3/017* (2013.01); *G06F 3/0481* (2013.01); *G06F 3/04812* (2013.01); *G06F 3/04842* (2013.01); *H04N 5/4403* (2013.01); *H04N 5/44582* (2013.01); *G02B 2027/014* (2013.01); *G02B 2027/0138* (2013.01); *G02B 2027/0178* (2013.01); *G02B 2027/0187* (2013.01); *H04N 2005/4425* (2013.01); *H04N 2005/4428* (2013.01)

(58) Field of Classification Search
CPC ... G06F 3/0484; G02B 27/01; G02B 27/0172; G02B 27/0179; G02B 2027/014; G02B 2027/0138; G02B 2027/0178; G02B 2027/0187
See application file for complete search history.

(56) References Cited

U.S. PATENT DOCUMENTS

| | | | |
|---|---|---|---|
| 9,557,955 B2* | 1/2017 | Rakshit | G06F 3/1454 |
| 9,733,789 B2* | 8/2017 | Katz | G06F 3/04815 |
| 9,952,433 B2* | 4/2018 | Um | G02B 27/017 |
| 2008/0204361 A1 | 8/2008 | Scales et al. | |
| 2011/0221656 A1* | 9/2011 | Haddick | G02B 27/017 345/8 |
| 2012/0169582 A1* | 7/2012 | Tschirhart | G02B 27/01 345/156 |
| 2012/0242698 A1 | 9/2012 | Haddick et al. | |
| 2013/0135353 A1* | 5/2013 | Wheeler | G09G 3/003 345/660 |
| 2013/0246967 A1 | 9/2013 | Wheeler et al. | |
| 2013/0257709 A1 | 10/2013 | Raffle et al. | |
| 2013/0278631 A1* | 10/2013 | Border | G02B 27/017 345/633 |
| 2013/0335303 A1 | 12/2013 | Maciocci et al. | |
| 2014/0333529 A1* | 11/2014 | Kim | G06F 3/04842 345/156 |

OTHER PUBLICATIONS

Written Opinion of the International Searching Authority, Application No. PCT/SE2013/051467, dated Sep. 4, 2014.
Communication with Supplementary European Search Report, EP Application No. 13898695.5, dated Nov. 23, 2016.

* cited by examiner

OPTICAL HEAD MOUNTED DISPLAY, TELEVISION PORTAL MODULE AND METHODS FOR CONTROLLING GRAPHICAL USER INTERFACE

CROSS REFERENCE TO RELATED APPLICATION

This application is a 35 U.S.C. § 371 national stage application of PCT International Application No. PCT/SE2013/051467, filed on Dec. 6, 2013, the disclosure and content of which is incorporated by reference herein in its entirety. The above-referenced PCT International Application was published in the English language as International Publication No. WO 2015/084227 A1 on Jun. 11, 2015.

TECHNICAL FIELD

Embodiments herein relate to control of graphical user interfaces in multimedia applications. In particular, an Optical Head Mounted Display and a method therein for controlling a Graphical User Interface as well as a television portal module and a method therein for enabling the Optical Head Mounted Display to control the Graphical User Interface displayed by the television portal module are disclosed. Moreover, corresponding computer programs and computer program products are disclosed.

BACKGROUND

Multimedia applications include devices that are capable of delivering a multimedia experience, i.e. both video and sound, to a user. These devices include for example television sets, media players, tablets, computers, mobile phones, laptops, disc players and more. In particular, big screen television sets have become very popular.

An existing big screen television set (TV), is typically controlled by an Infrared (IR) remote control. A Graphical User Interface (GUI) of the TV is controlled by use of navigation keys on the IR remote control.

The GUI can also be controlled via a second screen, e.g. a tablet, which allows a user of the TV, e.g. a viewer, to navigate through the GUI by inputting instructions for navigation in the GUI on the tablet. Typically, a so called swipe on a touch screen of the table will be sent as an instruction to move sideways in the GUI, i.e. similarly to when the user pressed an arrow key on the remote. An advantage with using the tablet for controlling the GUI over the IR remote control is that touch screen specific input features, often inherent with the tablet, such as swipe and two finger commands, can be utilized.

Furthermore, the existing TV can be equipped with a camera, which can capture a gesture of the user. The gesture can be that the user waves his hand to control the GUI.

Additionally, the existing TV can be equipped with a microphone, which can capture a voice command of the user. The voice command can then control the GUI of the TV.

Summarizing the above, it is clear that a GUI of a TV can be navigated, or manipulated, in a number of different manners. Each manner has its benefits and drawbacks. For example, hand waving may probably generate more accidental control of the GUI than use of an IR remote control. As another example, voice commands for controlling the GUI may be disturbing to people in the vicinity of the user controlling the GUI.

New types of electronic devices for different purposes are more or less constantly being developed. An example of these new types of electronic devices is referred to as Optical Head Mounted Displays (OHMD). OHMDs are expected to increase in popularity in the upcoming years.

SUMMARY

An object may be to overcome, or at least mitigate, the above mentioned drawbacks with the existing manners of controlling the GUI of e.g. a TV.

According to a first aspect, the object is achieved by a method, performed by an OHMD for controlling a GUI, displayed by a television portal module, by means of detecting a movement of a head of a user or an eye of a user. The television portal module further displays a GUI element for controlling the GUI. The OHMD comprises a display viewable by the user. The OHMD displays, at the display of the OHMD, a sight element for aiming, by the user, at the GUI element. The OHMD enters into a mode for controlling the GUI, when detecting that the sight element is aimed at the GUI element.

According to a second aspect, the object is achieved by a method, performed by a television portal module, for enabling an OHMD to control a GUI, displayed by the television portal module. The television portal module displays a GUI element for enabling the OHMD to enter into a mode for controlling I the GUI. The television portal module receives, from the OHMD, a command for controlling the GUI.

According to a third aspect, the object is achieved by an OHMD configured to control a GUI, displayed by a television portal module, by means of detecting a movement of a head of the user or an eye of the user. The television portal module further displays a GUI element for controlling the GUI. The OHMD comprises a display configured to display information viewable by the user. The OHMD comprises a displaying unit configured to display, at the display of the OHMD, a sight element for aiming, by the user, at the GUI element. The OHMD further comprises a detecting unit configured to detect that the sight element is aimed at the GUI element. Furthermore, the OHMD comprises an entering unit configured to enter into a mode for controlling the GUI, when the sight element is aimed at the GUI element.

According to a fourth aspect, the object is achieved by a television portal module configured to enable an OHMD to control a GUI, displayed by the television portal module. The television portal module comprises a displaying unit configured to display a GUI element for enabling the OHMD to enter into a mode for controlling the GUI. The television portal module further comprises a receiving unit configured to receive, from the OHMD, a command for controlling the GUI.

According to a fifth aspect, the object is achieved by a computer program for controlling a GUI, displayed by a television portal module. The computer program comprises computer readable code units which when executed on an OHMD causes the OHMD to perform the method in the OHMD as described herein.

According to a sixth aspect, the object is achieved by a computer program product, comprising a computer readable medium and the computer program described directly above.

According to a seventh aspect, the object is achieved by a computer program for enabling an OHMD to control a GUI displayed by the television portal module. The computer program comprises computer readable code units which when executed on a television portal module causes the television portal module to perform the method in the television portal module as described herein.

According to an eighth aspect, the object is achieved by a computer program product, comprising a computer readable medium and the computer program described directly above.

An advantage with the embodiments herein is that a user carrying, or wearing, an OHMD can control a GUI of a TV without having to use voice commands, gestures or a remote control. As mentioned, voice commands can be disturbing to others. Hand waving may not give a sufficiently fine grained control needed to control the GUI in a satisfying manner. As mentioned, gestures often have the issue of unintentionally being captured as a control command to the GUI.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
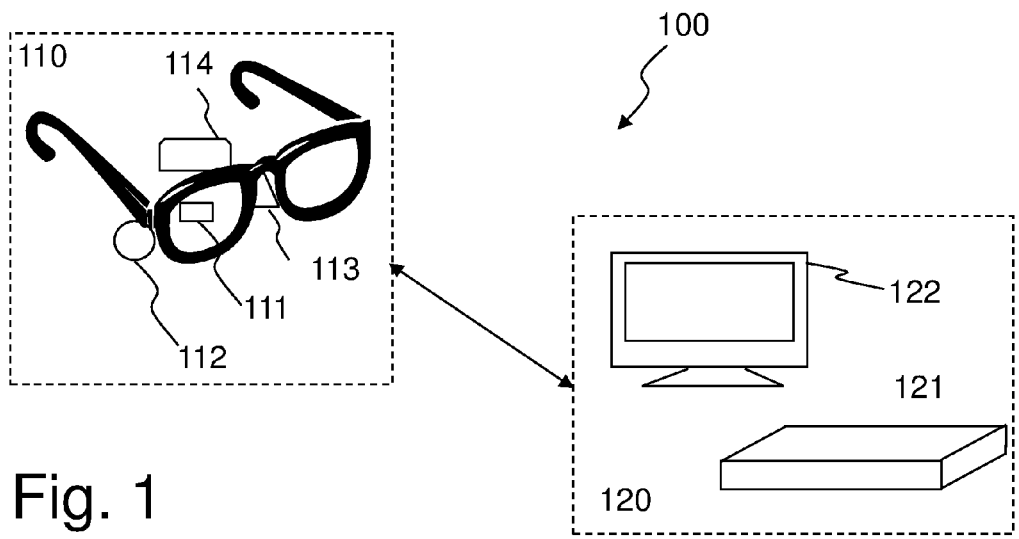
FIG. 1 is a schematic overview of an exemplifying system in which embodiments herein may be implemented.

Throughout the following description similar reference numerals have been used to denote similar units, modules, circuits, nodes, parts, items or features, when applicable. In the Figures, features that appear in some embodiments are indicated by dashed lines if not otherwise indicated.

Embodiments described herein uses an OHMD in combination with e.g. a big screen TV for controlling a GUI on the TV via, or by means of, the OHMD.

More specifically, when a television portal module displays a GUI element and the OHMD displays a sight element, according to embodiments, a user is able to aim the sight element at the GUI element in order to cause the OHMD to enter, directly or indirectly, a mode for controlling the GUI, displayed by the television portal module. When the OHMD may be in the mode, e.g. movements by a head of the user or an eye of the user may be sent, by the OHMD, as commands for controlling the GUI to the portal module.

As an exemplifying scenario, a user sits in front of a TV while wearing an OHMD that can control the TV GUI. The GUI is controlled by that the user merely moves his/her head or eye. In order for the user to not unintentionally control the TV GUI each time the head is moved a mode is required to be entered by the OHMD. Entering of the mode is initiated by aiming the sight element at the GUI element as mentioned above.

FIG. 1 depicts an exemplifying system 100 in which embodiments herein may be implemented.

The system 100 comprises an OHMD 110, such as wireless electronic glasses, glasses for viewing three dimensional videos or the like, e.g. so-called Google glasses. Any person who uses, e.g. carries, the OHMD 110 may be called a user within this disclosure.

The OHMD 110 comprises a display 111 viewable by the user. The display 111, which may show any kind of data to the user, may be a transparent or semi-transparent display, e.g. in the form of a Liquid Crystal Display (LCD), Light Emitting Diode (LED) display or the like.

The OHMD 110 comprises a camera 112, facing forward, i.e. normally in a viewing direction of the user. The camera 112 may capture still images or video in the viewing direction, such as a front facing direction.

The OHMD 110 may comprise a motion sensor 113, such as a gyroscope, an accelerometer or the like for tracking movement of the OHMD 110.

The OHMD 110 may comprise an eye sensor 114 for capturing user winks and/or tracking movements of the eye of the user.

The system 100 further comprises a television portal module 120, which may be comprised in a media box 121, such as a television set-top-box, video player/recorder, such as a video camera, Blu-ray player, Digital Versatile Disc (DVD)-player, media center, media player, a television set, a TV, a smart TV, household appliances including screens, typically fridges with screens, and the like.

FIG. 1 also illustrates a display device 122, which may be a screen, a monitor, a projector screen, a film screen or a television screen or the like. The television portal module 120 may be connected to the display device 122, which may be external to the television portal module 120. The display device 122 may comprise the television portal module 120.

As used herein, the term "GUI" refers to a collection of graphical elements displayed on a screen. A software component, sometimes referred to as a function or module, may be configured to control the GUI.

As shall be explained with reference to FIG. 4, the OHMD 110 may communicate with the television portal module 120 if at least one of the OHMD and the television portal module is configured to enable such communication. The communication may be realized by a wireless connection, such as Bluetooth, WiFi, Near Field Communication (NFC) or the like, or a wired connection, such as a Universal Serial Bus (USB) cable, an Ethernet connection or the like. In this context, the OHMD 110 and the television portal module 120 form part of the system 100.

Figure 2:
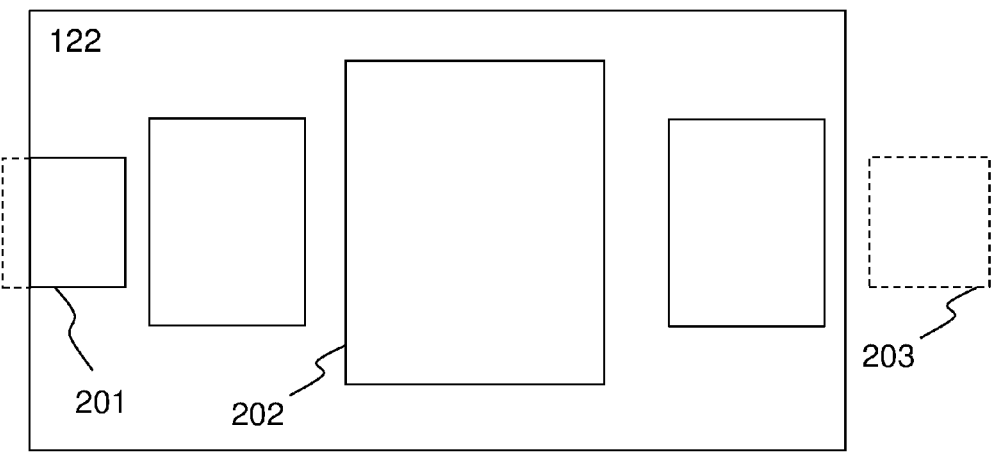
FIG. 2 is a schematic illustration of a GUI for a television portal

FIG. 2 is a schematic illustration of a GUI displayed at the display device 122 by the television portal module 120. In this example, purely as illustration, the GUI comprises a basic list of graphical objects 201, 202, 203 navigable in the horizontal direction. As can be seen in the Figure, all objects in the list do not entirely fit on the screen, such as object 201, and object 203 is completely outside the screen. Thus, the user is required to move the list to the left/right in order to completely see all objects.

Figure 3:
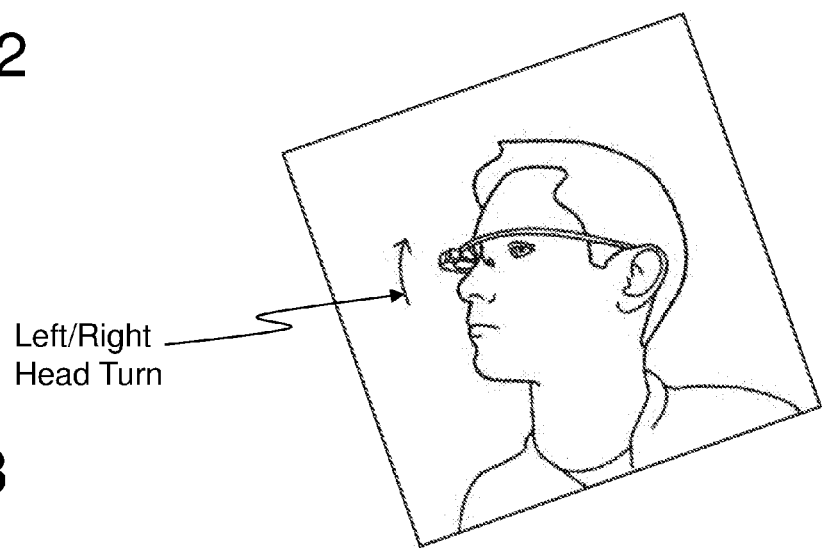
FIG. 3 is an illustration of a head of a user.

FIG. 3 is an illustration of a head of a user carrying the OHMD 110. Now assume that the user would like to navigate the list shown in FIG. 2. The navigation is realized by that the user turns the head, and thus also turns the OHMD 110, to the left and/or right. The turn of the head may be tracked by the OHMD 110 and a corresponding navigation command may be sent to the television portal module 120, which would cause a navigation action in the GUI.

Typically the television portal module 120 may display a TV Portal which executes in a Set-Top-Box (STB) connected to the display device 122 (or directly integrated in the TV). The television portal module 120 normally has a fix connection to a home network while the OHMD 110 are connected to the same network via WiFi, or by means of a direct wireless Device-to-Device (D2D) connection to the television portal module 120. TV Portal may include a number of graphical objects to display information about films, music, etc., or to allow the user to select different actions such as play, record, fast forward etc.

Upon activation of the television portal module 120 and the OHMD 110, a connection, in the form of a direct or indirect connection, e.g. a socket or http-connection, between them is opened. The television portal module 120 starts to listen for commands from the OHMD 110 and the OHMD 110 starts to detect and send commands. The detection of the commands is described e.g. in action 408 below. One way of activating the OHMD 110 would be to activate a control module for controlling the GUI when the OHMD 110 is switched on, or by a voice command or the like.

When the user is watching TV and would like to execute some TV command he would activate the corresponding functionality on the TV, typically open a TV portal menu. One way of activating the television portal module 120 would be to activate it by allowing the user to navigate the GUI and select the television portal module 120 to be active.

Figure 4:
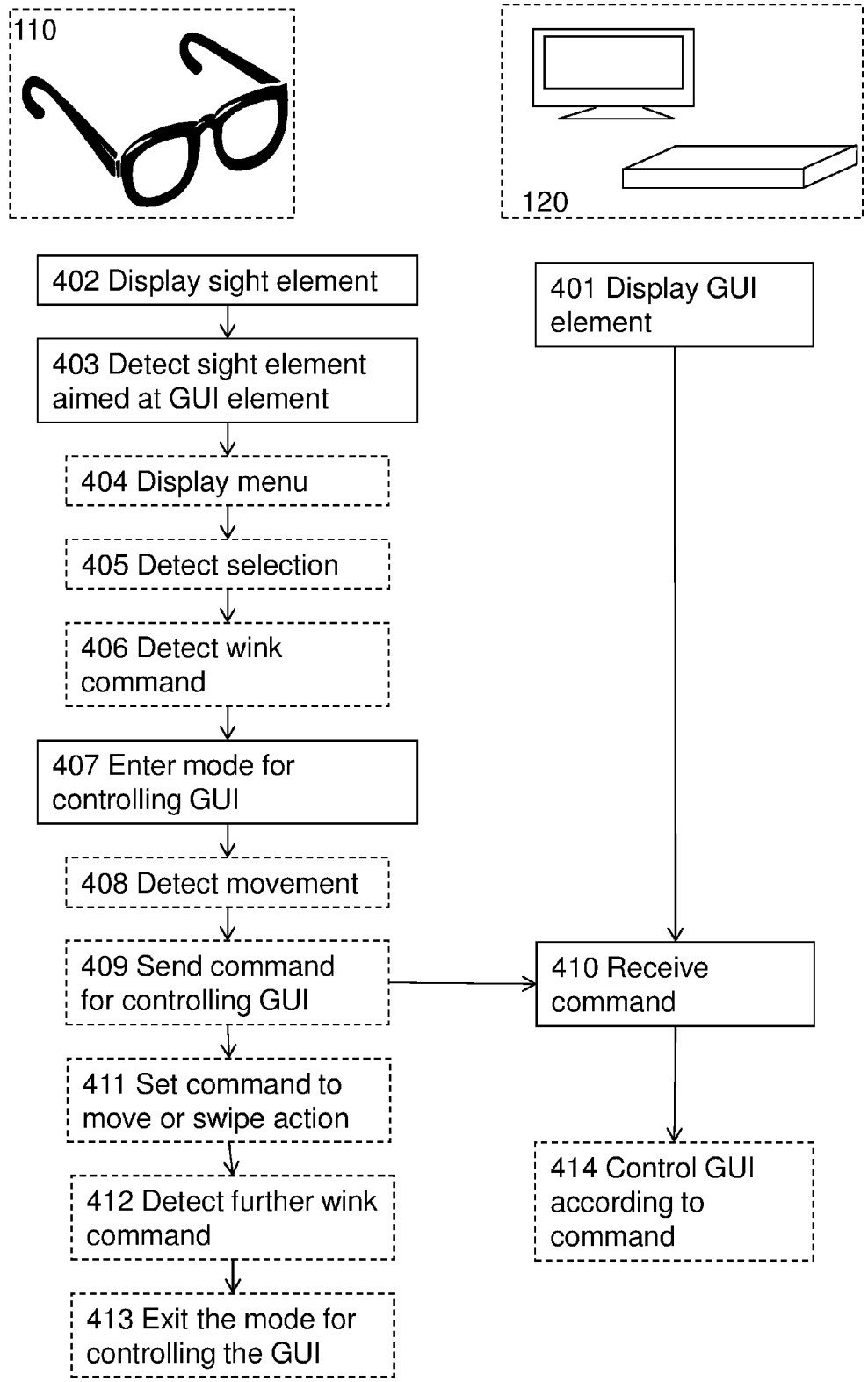
FIG. 4 is a schematic, combined signaling scheme and flowchart illustrating embodiments of the methods when performed in the system according to FIG. 1.

FIG. 4 illustrates an exemplifying method for managing a GUI of the television portal module 120, when implemented in the system 100 of FIG. 1. Thus, the OHMD performs a method for controlling the GUI, displayed by the television portal module 120. The GUI is controlled by detection of movements of a head of a user or an eye of a user. In order to support the OHMD 110, the television portal module 120 performs a method for enabling the OHMD 110 to control the GUI.

The following actions may be performed in any suitable order.

Action 401

In order to the OHMD 110 to be able to detect a GUI element in action 403, the television portal module 120 displays the GUI element. In this manner, the television portal module 120 enables the OHMD 110 to enter into a mode for controlling the GUI in action 407 below.

Hence, the television portal module 120 has introduced the GUI element at locations/objects in the GUI that the user should be able to control by means of the OHMD 110.

Action 402

After action 401 has been performed, the OHMD 110 displays, at the display 111 of the OHMD 110, a sight element for aiming, by the user, at the GUI element. By use of the sight element the user may align the sight element with the GUI element.

Action 402 may also be performed before action 401.

Action 403

Figure 7:
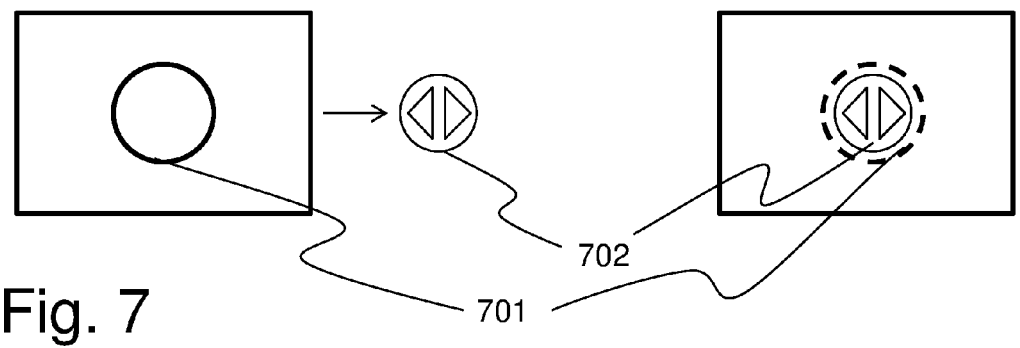
FIG. 7 is two schematic views of a GUI element and a sight element.

After action 401 and 402 have been performed, the OHMD 110 is able to detect that the sight element is aimed at the GUI element. FIG. 7 below illustrates how alignment of the sight element and GUI element.

By aligning the GUI element with the sight element displayed by the OHMD 110, the user may, either immediately or following some of the actions below, control the GUI by moving his head or eye.

In action 407 below, the OHMD 110 enters a mode for controlling the GUI. However, before action 407 is performed, actions 404 and 405 may be performed according to some first embodiments, and action 406 may be performed according to some second embodiments.

Action 404

In the first embodiments, a menu may be used, e.g. by the user, to select the mode for controlling the GUI. Thus, the OHMD 110 may display, at the display of the OHMD 110, a menu including a command item for entering the mode for controlling the GUI.

Action 405

In the first embodiments, the OHMD 110 may detect a selection, e.g. by the user, of the command item. Next, action 407 may be performed in response to the selection of the command item.

Action 406

In the second embodiments, the OHMD 110 may detect a wink command which causes the OHMD 110 to perform action 407. The wink command may indicate different actions, e.g. one wink may indicate swipe action and two winks may indicate scroll page by page, where a page would be contents fitting within the display device 122.

Action 407

The OHMD 110 enters, e.g. directly or indirectly according to the first and second embodiments, into the mode for controlling the GUI, when detecting, as in action 403, that the sight element is aimed at the GUI element.

Action 408

Now that the OHMD 110 has entered the mode, the OHMD 110 may detect the movement of the head of the user or the eye of the user. The movement of the head of the user or the eye of the user may be translated to a command for controlling the GUI.

The command may instruct the television portal module 120 to cause one action of a set of actions in the GUI. The set of actions may comprise at least one of a move action or a swipe action.

Action 409

In order to inform the television portal module 120 about what action to cause in the GUI, the OHMD 110 may send the command to the television portal module 120.

Action 410

Subsequent to action 409, the television portal module 120 may receive, from the OHMD 110, the command. Next, the television portal module 120 may perform action 414 below, but first some further actions in the OHMD 110 are described.

Action 411

In some third embodiments, the OHMD 110 may set the command to one action of the set of actions in a cyclic manner, when no movement of the head of the user or the eye of the user may be detected during a defined time period. This is explained in more detail with reference to FIG. 9.

Action 412

According to the second embodiments, the OHMD 110 may detect a further wink command for exiting the mode for controlling the GUI, before performing action 413 below.

Action 413

In order to allow the user to freely move the head or eye without causing any action, or navigation, in the GUI, the OHMD 110 may exit the mode for controlling the GUI.

According to the first embodiments, the menu includes a release item for exiting the mode for controlling the GUI. In these embodiments, action 413 may be performed in response to a selection of the release item.

According to the second embodiments, action 413 is performed in response to action 412.

According to the third embodiments, action 413 may be performed when the command has been set to a move action a first number of times and to a swipe action a second number of times. The second number of times may be equal to the first number of times.

Action 414

When the television portal module 120 has received the command in action 410, the television portal module 120 may control the GUI according to the command. In this manner, the movement of the head of the user or the eye of the user is translated into e.g. move or swipe actions in the GUI of the television portal module 120.

Figure 5:
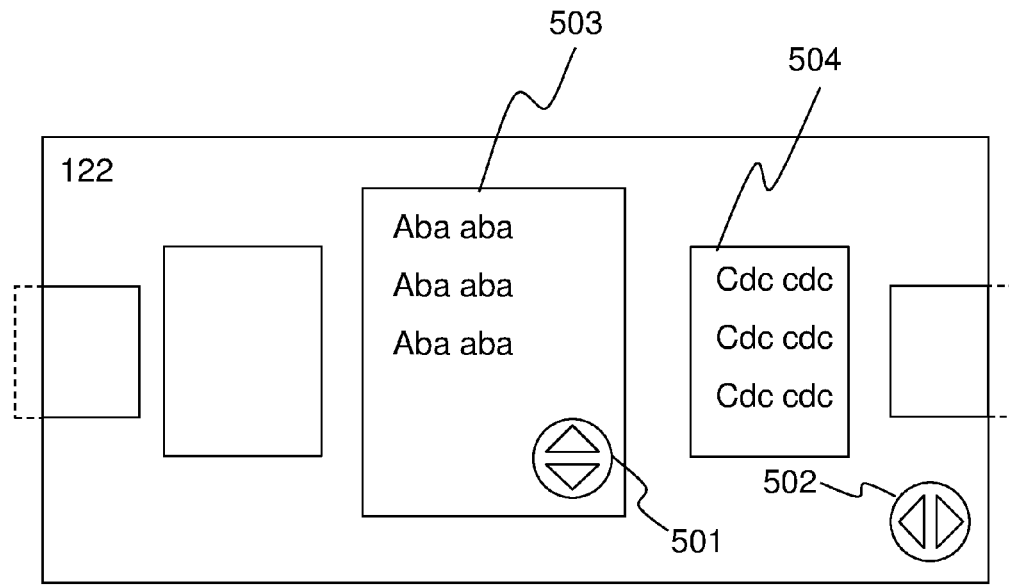
FIG. 5 is schematic illustration an exemplifying appearance of a GUI.

FIG. 5 illustrates a display device 122 of a television portal module 120 displaying two lists that may be controlled by the OHMD 110. Thus, two GUI elements 501, 502, shown as encircled double triangles pointing in the horizontal and vertical direction, are inserted, e.g. displayed at the display device 122, by the television portal module 120. The purpose of the GUI elements 501, 502 is to provide images that are known to the OHMD 110. Since the GUI elements 501, 502 are known to the OHMD 110, the OHMD 110 is able to process an image such as to detect presence of the GUI elements 501, 502. Graphical objects 503, 504 will be referred to in conjunction with FIG. 8.

The OHMD 110 may use the camera 112 to capture the display device 122 as a sequence of images, e.g. a video. The video may be continuously analysed, in real-time or near real-time, by the OHMD 110 in order to identify GUI elements as mentioned above. When a GUI element is identified, the OHMD 110 would display a sight element in the display 111 of the OHMD 110. In this manner, the sight element will only be visible when there is a GUI element to be aimed at by the user. In the exemplifying illustration below, the sight element is a circle. The sight element may have other shapes, appearances and colours as well.

Now, in order to control one of the lists in the illustration above the user would align the sight element at the display of the OHMD 110 with the GUI element at the display device 122 by moving the head so that the sight element and the GUI element are in front of each other taken from a perspective of the eye of the user. The OHMD 110 may signal to the user, e.g. by changing colour of the sight element, when the sight element is aligned with the GUI element and the OHMD 110 may now start to control the GUI.

Figure 6:
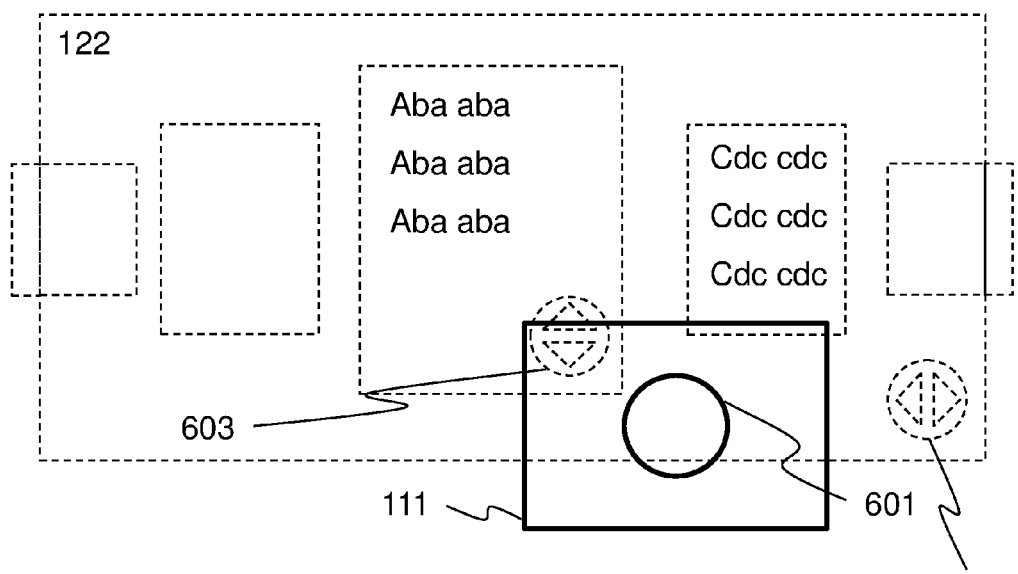
FIG. 6 is another schematic illustration another exemplifying appearance of a GUI.

FIG. 6 shows the display device 122, and illustrates the display 111 of the OHMD 110 with an exemplifying sight element 601 in a non-aligned position with respect to the GUI elements, here denoted 602 and 603. The GUI of the television portal module 120 is visible in the background, as illustrated by the dashed lines.

When the user moves the head, or eye, to align the sight element 601 with one of the GUI elements 602, 603 in the underlying GUI of the television portal module 120, the sight element 601 may change appearance, shape or colour when the sight element and one of the GUI elements 602, 603 are aligned. In this context, the underlying GUI may be said to be located behind the display 111 when seen from the user's perspective. Note that the OHMD 110 may have a see-through display which means the user sees the GUI "under" the sight element. On OHMDs 110 with opaque displays, the video captured of the GUI would have to be displayed on the OHMD 110 display as well.

In FIG. 7, to the left, a sight element 701 is moved to become aligned with a GUI element 702. An exemplifying appearance of the sight element 701 and the GUI element 702 when aligned is shown in the right portion of FIG. 7. When aligned, the OHMD 110 may begin to will send commands for controlling the GUI to the television portal module 120.

Figure 8:
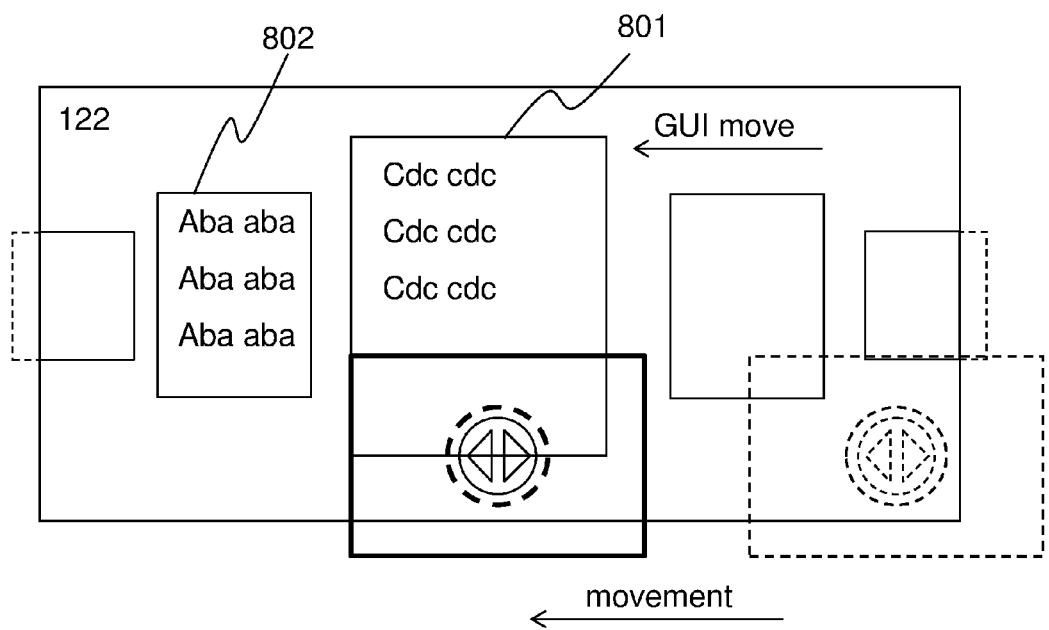
FIG. 8 is a further schematic illustration a further exemplifying appearance of a GUI.

FIG. 8 shows the display device 122, and illustrates an exemplifying command for controlling the GUI. In this case, a so called move action is described. The OHMD 110 has entered the mode for controlling the GUI. Thus, as the user moves the head, or eye, commands for instructing the GUI to cause move actions are sent from the OHMD 110 to the television portal module 120. When comparing to FIG. 5, it shall be observed that a graphical object 801 has now been moved to the center. In FIG. 5, the graphical object 801 corresponds to graphical object 504 and a graphical object 802 corresponds to graphical object 503.

As seen in the illustration above the OHMD 110 moves and the graphical object(s) that corresponds to the aligned GUI element (the horizontal list in this case) moves accordingly so that the GUI element continues to be aligned during the entire move.

During the move the OHMD 110 continuously sends commands for controlling the GUI, e.g. move commands, together with coordinates, describing the move, to the television portal module 120. As an example, the coordinates may be coordinates of the GUI element and/or the sight element depending on coordinate system used as reference in a mathematical meaning.

As an example, the television portal module 120 receives the following commands from the OHMD 110:

Command 1, time=t1: (540, 318)
Command 2, time=t2: M(518, 328)
Command 3, time=t3: M(490, 326)
Command 4, time=t4: M(476, 320)
Command 5, time=t5: M(461, 314)
Command 6, time=t6: M(443, 316) t1<t2< . . . <t6

Each command is sent separately at times t1, t2, . . . , t6, at which it is generated. The television portal module 120 will use the first coordinate pair received to identify which GUI element is targeted by the OHMD 110. The subsequent coordinates are used to decide where to move the objects controlled by the targeted GUI element, including a type of action to perform. The types of actions will be explained in the section following directly below.

The types of actions may include at least one of move action, swipe action, select action and release action and more.

A move action may be similar to when a user drags a finger over a touch screen of a tablet. That is to say, the GUI element continuously follows movement(s) detected by the OHMD 110. As mentioned above, the movements may be movements of the OHMD 110 itself, as when the user moves the head. Alternatively or additionally, the movements may be tracking of eye movements detected by the OHMD 110.

A swipe action may be similar to a swipe gesture on a tablet. The GUI element and the sight element are initially aligned, but as the user moves e.g. the head, the movement is sent to the television portal module 120 as a swipe action causing, for example, a list in the GUI to spin away. The list may be associated with the aligned GUI element.

A selection/click action may be similar to when a user of a computer uses a mouse to click at objects displayed to the user. In the sections below, exemplifying manners are described.

A release action refers to that the mode for controlling the GUI is exited. In this manner, the user may release, i.e. no longer aligned to control GUI, the GUI element and the sight element from each other when the user no longer wishes to navigate through the GUI.

Figure 9:
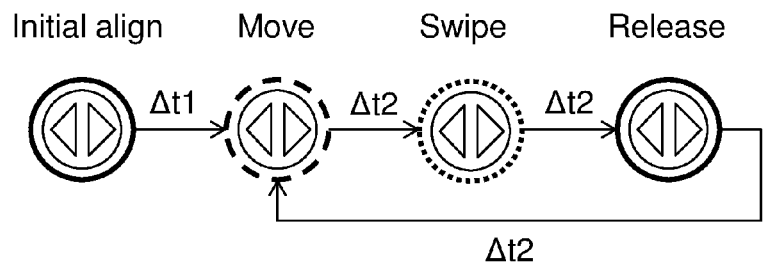
FIG. 9 is a representation illustrative of cycling between move and swipe action and released mode.

In FIG. 9, an exemplifying procedure for selecting commands for controlling GUI via cycling is described.

'Initial align' refers to when the user aims at the GUI element, i.e. before the OHMD 110 has entered the mode for controlling the GUI. When the mode for controlling the GUI has been entered by the OHMD 110, the OHMD 110 may be said to be in one or more sub-modes, e.g. 'move' sub-mode or 'swipe' sub-mode. A sub-mode corresponds to what action the command, when sent by the OHMD 110 to the television portal module 120, will cause in the GUI.

Assume that the user moves the head, with the OHMD 110 activated to detect alignment as in action 403 above.

Now, after a short time period Δt1 while the sight element of the OHMD 110 is held still, i.e. not moving, over the GUI element, rendered by the television portal module 120, the OHMD 110 may enter the mode for controlling the GUI. At the same time, a default command, such as move action, may be set. Expressed differently, a default sub-mode may be entered.

If the user, within a time period Δt2, moves the head a command for causing a move action in the GUI will be sent by the OHMD 110. If the user does not move the head, and thereby the OHMD 110, and instead keep the head still for longer than, or equal to, the time period Δt2, the OHMD 110 may be said to enter a 'swipe' sub-mode. If the user continues to keep still, again during the time period Δt2 starting from when the 'swipe'-sub mode was entered, the OHMD 110 will enter 'release' sub-mode. This means that the sight element of the OHMD 110 will be unlocked from the GUI element of the television portal module 120 if the user moves the head in the 'release'-sub-mode. Hence, the user's head may be freely moved without affecting the GUI displayed by the television portal module 120.

To conclude, when the user keeps the head still such that the sight element is aligned with the GUI element, the mode and sub-modes will be periodically changed and the user will have to wait for the desired mode, or sub-mode, before moving the head.

The different sub-modes could for example be indicated by changing the color of the sight element of the OHMD 110.

The click action, or select action, does not fit into the same cycle. For example, not all GUI objects that can be moved can also be selected. Selection may for example be solved by using a second type of GUI element, displayed by the television portal module 120. The second type of GUI elements may be used uniquely for selecting, where e.g. a 2 s period of alignment may cause a click action.

In other examples, the selecting may be performed by detection of wink commands. In these examples, when the OHMD 110 is equipped with a wink sensor, the periodic cycling described above may be fully or partially replaced by wink commands. E.g. aligning the sight element and winking two times may trigger swipe mode. Similarly, click and selection actions could be triggered via other distinct wink patterns, or wink commands.

In further examples relating to the first embodiments, the selecting may be performed by means of a menu displayed at the display of the OHMD 110. By use of the menu, different sub-modes, or commands, may be directly selectable by the user. Hence, the user need not wait for the desired sub-mode, or command, as with the cycling.

FIGS. 10a-10e show an example of when a menu is used to select commands for controlling the GUI or to release the OHMD from the mode for controlling the GUI.

Figure 10A:
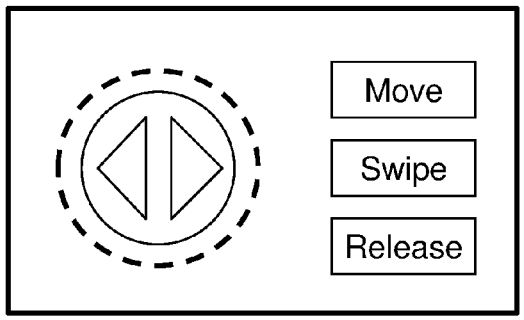
FIGS. 10a-10e are block diagram illustrating use of a menu according to some embodiments herein.

FIG. 10a shows the OHMD 110 when entered into the mode for controlling the GUI. A menu with menu items, such as move, swipe and release, is displayed at the display of the OHMD 110.

Figure 10B:
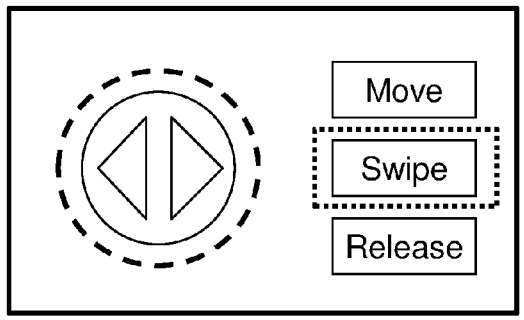

FIG. 10b shows that one of the menu items may be marked when the user moves the head to the right.

Figure 10C:
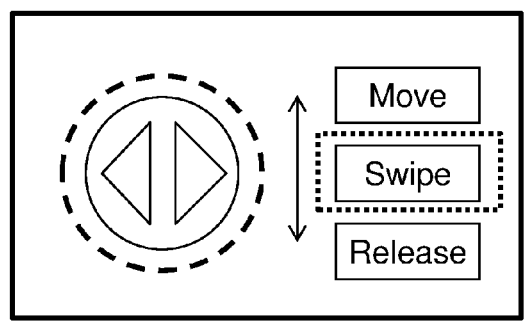

FIG. 10c shows a marker for marking a menu item may be moved up or down when the user moves the head up/down.

Figure 10D:
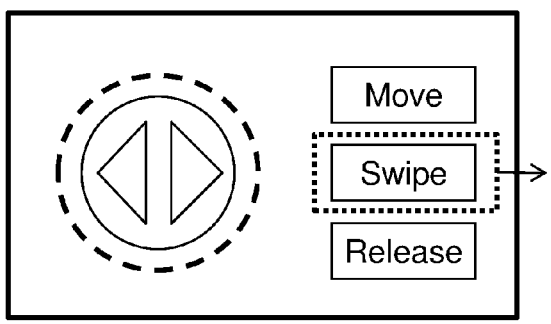

FIG. 10d shows that the marked menu item may be selected when the user moves the head to the right again.

Figure 10E:
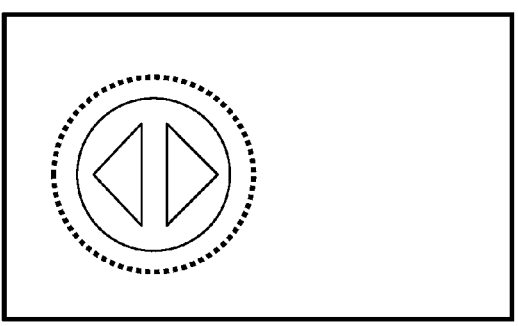

FIG. 10e shows that appearance, such as shape and/or colour, of the sight element may indicate which of e.g. move action and swipe action is currently active (selected).

The menu shown in FIG. 10a may be visible again when user does not move the head.

Figure 11:
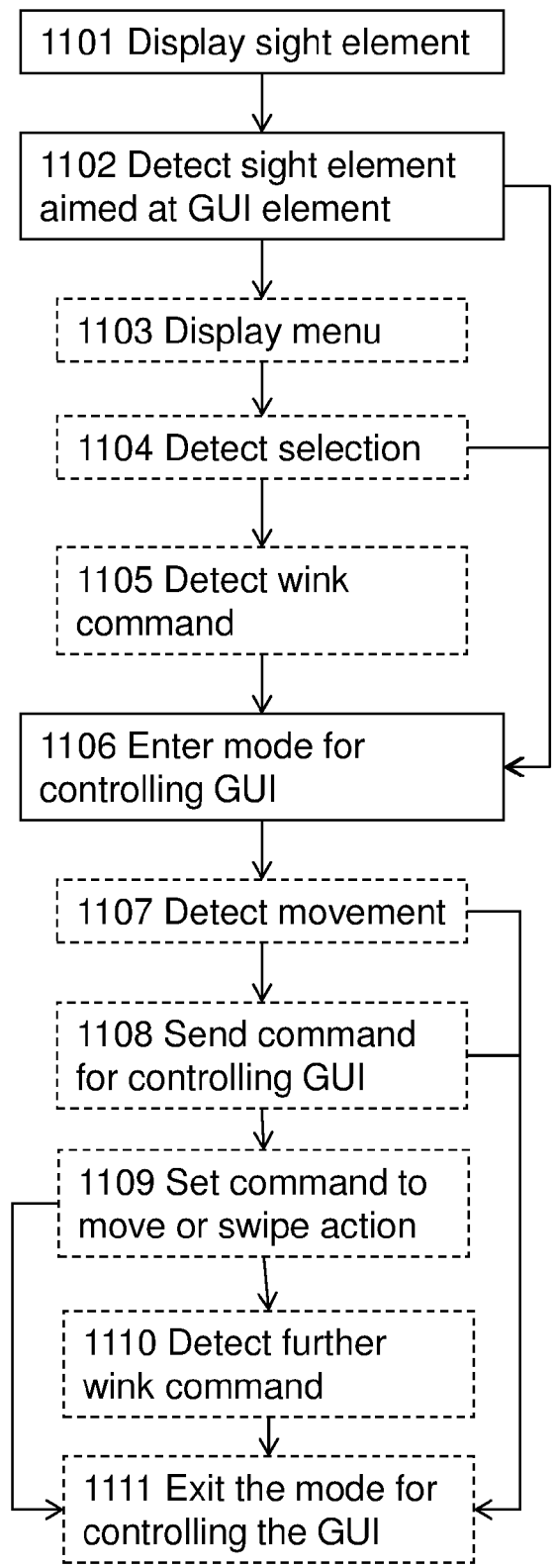
FIG. 11 is a flowchart illustrating embodiments of the method in the OHMD.

In FIG. 11, an exemplifying, schematic flowchart of the method in the OHMD 110 is shown. As mentioned, the OHMD 110 performs a method for controlling a Graphical User Interface, GUI, displayed by a television portal module 120, by means of detecting a movement of a head of a user or an eye of a user.

As mentioned, the television portal module 120 further displays a GUI element for controlling the GUI. The OHMD 110 comprises a display 111 viewable by the user. The GUI may be displayed at a display device. The television portal module 120 may be connected to the display device, which may be external to the television portal module 120. Alternatively, the display device may comprise the television portal module 120.

The following actions may be performed in any suitable order.

Action 1101

The OHMD 110 displays, at the display 111 of the OHMD 110, a sight element for aiming, by the user, at the GUI element. This action is similar to action 402.

Action 1102

The OHMD 110 may detect that the sight element is aimed at the GUI element. The sight element may be aimed at the GUI element by that the user aligns the sight element with the GUI element. This action is similar to action 403.

Action 1103

Before action 1106 below, the OHMD 110 may display, at the display of the OHMD 110, a menu including a command item for entering the mode for controlling the GUI. This action is similar to action 404.

Action 1104

The OHMD 110 may detect a selection, by the user, of the command item. This action is similar to action 405.

Action 1105

Before action 1106 below, the OHMD 110 may detect a wink command for entering the mode for controlling the GUI. This action is similar to action 406.

Action 1106

The OHMD 110 enters into a mode for controlling the GUI, when detecting that the sight element is aimed at the GUI element. This action is similar to action 407.

Action 1107

The OHMD 110 may detect the movement of the head of the user or the eye of the user. This action is similar to action 408.

Action 1108

The OHMD 110 may send a command for controlling the GUI to the television portal module 120. This action is similar to action 409.

The command may instruct the television portal module 120 to cause one action of a set of actions in the GUI. The set of actions may comprise at least one of a move action or a swipe action.

Action 1109

The OHMD 110 may set the command to one action of the set of actions in a cyclic manner, when no movement of the head of the user or the eye of the user may be detected during a defined time period. This action is similar to action 411.

Action 1110

The OHMD 110 may detect a further wink command for exiting the mode for controlling the GUI, before performing the exiting 413. This action is similar to action 412.

Action 1111

The OHMD 110 may exit the mode for controlling the GUI. This action is similar to action 413.

The exiting may be performed when the command has been set to a move action a first number of times and to a swipe action a second number of times. The second number of times may be equal to the first number of times.

The menu includes a release item for exiting the mode for controlling the GUI. The exiting may be performed in response to a selection of the release item.

Figure 12:
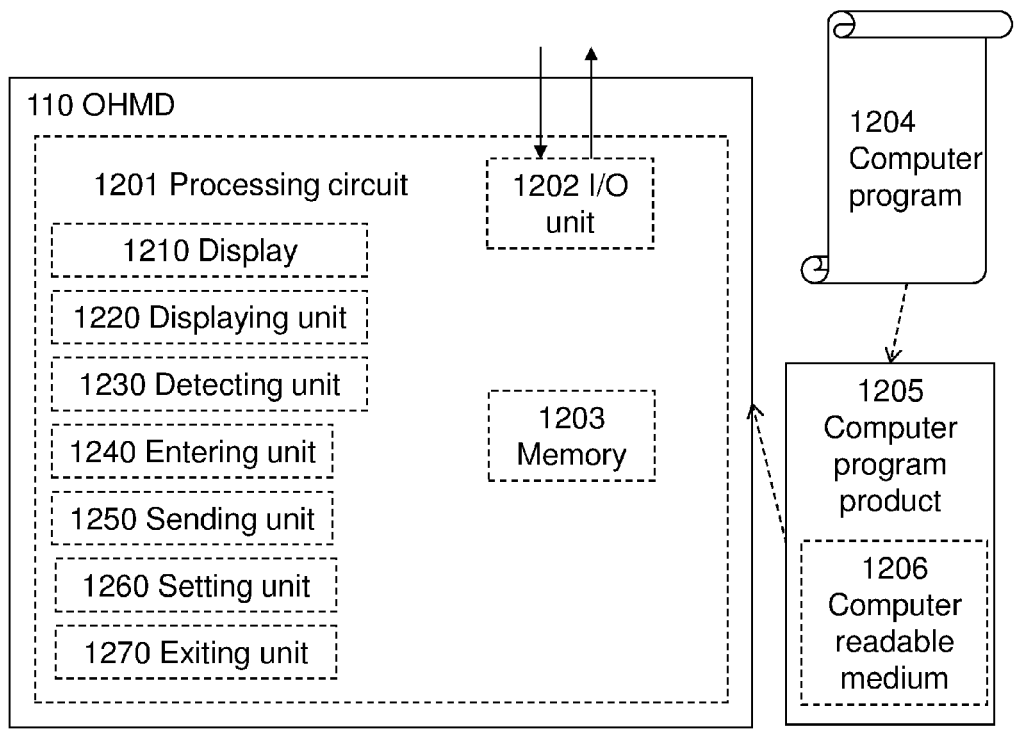
FIG. 12 is a block diagram illustrating embodiments of the OHMD.

With reference to FIG. 12, a schematic block diagram of the OHMD 110 is shown. The OHMD 110 is configured to perform the methods in FIGS. 4 and/or 11. Thus, the OHMD 110 is configured to control a GUI, displayed by a television portal module 120, by means of detecting a movement of a head of the user or an eye of the user. As mentioned, the television portal module 120 displays a GUI element for controlling the GUI.

The OHMD 110 comprises a display 1210 configured to display information viewable by the user. The display 1210 may be the display 111 of FIG. 1.

The OHMD 110 further comprises a displaying unit 1220 configured to display, at the display 1210 of the OHMD 110, a sight element for aiming, by the user, at the GUI element. The sight element may be aimed at the GUI element by that the user aligns the sight element with the GUI element.

The displaying unit 1220 may further be configured to display, at the display of the OHMD 110, a menu including a command item for entering the mode for controlling the GUI; and wherein the entering unit 1240 may be configured to enter into the mode for controlling the GUI in response to a selection, by the user, of the command item.

The OHMD 110 further comprises a detecting unit 1230 configured to detect that the sight element is aimed at the GUI element.

The detecting unit 1230 may further be configured to detect a wink command for entering the mode for controlling the GUI.

The detecting unit 1230 may further be configured to detect the movement of the head of the user or the eye of the user.

The detecting unit 1230 may be configured to detect a further wink command for exiting the mode for controlling the GUI.

Furthermore, the OHMD 110 comprises an entering unit 1240 configured to enter into a mode for controlling the GUI, when the sight element is aimed at the GUI element.

The entering unit 1240 may be configured to enter into the mode for controlling the GUI in response to the detection of the wink command.

The OHMD 110 may further comprise a sending unit 1250 configured to send a command for controlling the GUI to the television portal module 120, when a movement of the head of the user or the eye of the user may be detected.

The command may instruct the television portal module 120 to cause one action of a set of actions in the GUI. The set of actions may comprise at least one of a move action or a swipe action.

The OHMD 110 further comprises a setting unit 1260 configured to set the command to one action of the set of actions in a cyclic manner, when no movement of the head of the user or the eye of the user may be detected during a defined time period.

The OHMD 110 comprises an exiting unit 1270 configured to exit the mode for controlling the GUI.

The exiting unit 1270 may be configured to exit the mode for controlling the GUI, when the command has been set to a move action a first number of times and to a swipe action a second number of times. The second number of times may be equal to the first number of times.

The menu may include a release item for exiting the mode for controlling the GUI. The exiting unit 1270 may be configured to perform exiting in response to a selection of the release item.

The exiting unit 1270 may be configured to perform exiting in response to detection of the further wink command.

In some embodiments, the OHMD 110 comprises a processing circuit 1201 configured to according to one or more of the units described above. Accordingly, the processing circuit 1201 is configured to perform the method according FIGS. 4 and/or 11.

The OHMD 110 may further comprise an Input/output (I/O) unit 1202 configured to send and/or receive the command as described herein. The I/O unit 1202 may comprise the sending unit 1205, a transmitter and/or a receiver.

Furthermore, the OHMD 110 may comprise a memory 1203 for storing software to be executed by, for example, the processing circuit 1201.

FIG. 12 also illustrates software in the form of a computer program 1204 for controlling the GUI, displayed by the television portal module 120. The computer program comprises computer readable code units which when executed on the OHMD 110 causes the OHMD 110 to perform the method according to FIGS. 4 and/or 11.

Finally, FIG. 12 illustrates a computer program product 1205, comprising computer readable medium 1206 and the computer program 1204 as described directly above stored on the computer readable medium 1206.

More generally, the OHMD 110 is, according to some further embodiments, configured according to one or more of the units described above. Accordingly, as mentioned above, the OHMD 110 is configured to perform the method according FIGS. 4 and/or 11.

Figure 13:
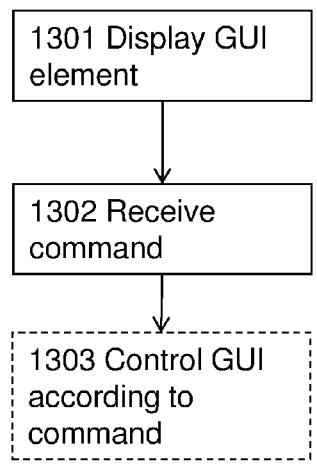
FIG. 13 is a flowchart illustrating embodiments of the method in the television portal module.

In FIG. 13, an exemplifying, schematic flowchart of the method in the television portal module 120 is shown. As mentioned, the television portal module 120 performs a method for enabling the OHMD 110 to control a GUI, displayed by the television portal module 120.

The following actions may be performed in any suitable order.

Action 1301

The television portal module 120 displays a GUI element for enabling the OHMD 110 to enter into a mode for controlling I the GUI. This action is similar to action 401.

Action 1302

The television portal module 120 receives, from the OHMD 110, a command for controlling 410 the GUI. This action is similar to action 410.

The command may instruct the television portal module 120 to cause one action of a set of actions in the GUI. The set of actions may comprise at least one of a move action or a swipe action.

Action 1303

The television portal module 120 may control the GUI according to the received command. This action is similar to action 414.

Figure 14:
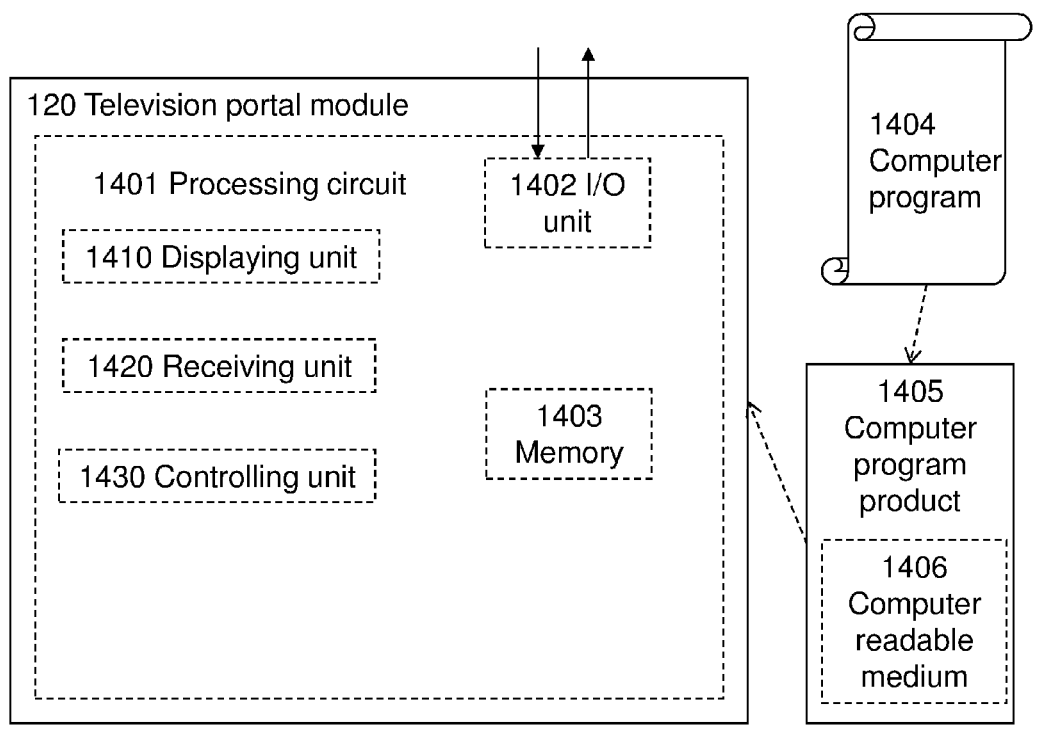
FIG. 14 is a block diagram illustrating embodiments of the television portal module.

With reference to FIG. 14, a schematic block diagram of the television portal module 120 is shown. The television portal module 120 is configured to perform the methods in FIGS. 4 and/or 13. Thus, television portal module 120 is configured to enable the OHMD 110 to control the GUI, displayed by the television portal module 120.

The television portal module 120 comprises a displaying unit 1410 configured to display a GUI element for enabling the OHMD 110 to enter into a mode for controlling the GUI.

The television portal module 120 further comprises a receiving unit 1420 configured to receive, from the OHMD 110, a command for controlling the GUI.

The television portal module 120 may further comprise a controlling unit 1430 configured to control the GUI according to a command received from the OHMD 110.

The command may instruct the television portal module 120 to cause one action of a set of actions in the GUI. The set of actions may comprise at least one of a move action or a swipe action.

In some embodiments, the television portal module 120 comprises a processing circuit 1401 configured to according to one or more of the units described above. Accordingly, the processing circuit 1401 is configured to perform the method according FIGS. 4 and/or 11.

The television portal module 120 may further comprise an Input/output (I/O) unit 1402 configured to send and/or receive the command as described herein. The I/O unit 1402 may comprise the receiving unit 1420, a transmitter and/or a receiver.

Furthermore, the television portal module 120 may comprise a memory 1403 for storing software to be executed by, for example, the processing circuit.

FIG. 14 also illustrates software in the form of a computer program 1404 for enabling the OHMD 110 to control the GUI displayed by the television portal module 120. The computer program 1404 comprises computer readable code units which when executed on the television portal module 120 causes the television portal module 120 to perform the method according to FIGS. 4 and/or 13.

Finally, FIG. 14 illustrates a computer program product 1405, comprising computer readable medium 1406 and the computer program 1404 as described directly above stored on the computer readable medium 1406.

More generally, the television portal module 120 is, according to some further embodiments, configured according to one or more of the units described above. Accordingly, as mentioned above, the television portal module 120 is configured to perform the method according FIGS. 4 and/or 13.

As used herein, the term "processing circuit" may refer to a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing circuit may be embodied by a software or hardware module. Any such module may be a determining means, estimating means, capturing means, associating means, comparing means, identification means, selecting means, receiving means, transmitting means or the like as disclosed herein. As an example, the expression "means" may be a unit, such as a determining unit, selecting unit, etc.

As used herein, the expression "configured to" may mean that a processing circuit is configured to, or adapted to, by means of software or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

The invention claimed is:

1. A method, performed by an Optical Head Mounted Display, OHMD, for controlling a Graphical User Interface, GUI, displayed by a television portal module, by means of detecting a movement of a head of a user or an eye of a user, wherein the television portal module further displays a GUI element for controlling the GUI, wherein the OHMD comprises a display viewable by the user, wherein the method comprises:
   capturing an image of the GUI displayed by the television portal module;
   determining the GUI element is present in the captured image;
   responsive to determining the GUI element is present in the captured image, displaying, at the display of the OHMD, a sight element for aiming, by the user, at the GUI element of the GUI displayed by the television portal module;
   entering into a mode for controlling the GUI displayed by the television portal module responsive to detecting that the sight element is aimed at the GUI element of the GUI displayed by the television portal module;
   responsive to entering into the mode for controlling the GUI displayed by the television portal module, detecting the movement of the head of the user or the eye of the user; and
   sending a command to the television portal module for controlling the GUI displayed by the television portal module based on the detected movement.

2. The method according to claim 1, wherein the method further comprises, before entering into the mode for controlling the GUI:
   displaying, at the display of the OHMD, a menu including a command item for entering the mode for controlling the GUI; and
   detecting a selection, by the user, of the command item.

3. The method according to claim 1, wherein the method comprises, before entering of the mode for controlling the GUI:
   detecting a wink command for entering the mode for controlling the GUI.

4. The method according to claim 1, wherein the command instructs the television portal module to cause one action of a set of actions in the GUI displayed by the television portal module, wherein the set of actions comprises at least one of a move action or a swipe action.

5. The method according to claim 1, wherein the method comprises:
setting the command to one action of the set of actions in a cyclic manner, when no movement of the head of the user or the eye of the user is detected during a defined time period.

6. The method according to claim 1, wherein the method comprises:
exiting the mode for controlling the GUI.

7. The method according to claim 6, wherein the method comprises:
setting the command to one action of the set of actions in a cyclic manner, when no movement of the head of the user or the eye of the user is detected during a defined time period,
wherein the exiting is performed when the command has been set to a move action a first number of times and to a swipe action a second number of times, wherein the second number of times is equal to the first number of times.

8. The method according to claim 6, wherein the method further comprises, before entering into the mode for controlling the GUI:
displaying at the display of the OHMD, a menu including a command item for entering the mode for controlling the GUI; and
detecting a selection, by the user, of the command item, wherein the menu includes a release item for exiting the mode for controlling the GUI, wherein the exiting is performed in response to a selection of the release item.

9. The method according to claim 6, wherein the method further comprises:
before entering of the mode for controlling the GUI, detecting a wink command for entering the mode for controlling the GUI; and
detecting a further wink command for exiting the mode for controlling the GUI, before performing the exiting.

10. The method according to claim 1, wherein the sight element is aimed at the GUI element by that the user aligns the sight element with the GUI element.

11. The method according to claim 1, wherein the GUI is displayed at a display device.

12. The method according to claim 11, wherein the television portal module is connected to the display device, which is external to the television portal module.

13. The method according to claim 11, wherein the display device comprises the television portal module.

14. A computer program product comprising a non-transitory computer readable storage medium storing instructions for controlling a Graphical User Interface, GUI, displayed by a television portal module, the instructions when executed on a processor of an Optical Head Mounted Display, OHMD, causes the OHMD to perform the method according to claim 1.

15. A method, performed by a television portal module, for enabling an Optical Head Mounted Display, OHMD, to control a Graphical User Interface, GUI, displayed by the television portal module on a display device of the television portal module, wherein the method comprises:
displaying a GUI element on said display device for enabling the OHMD to enter into a mode for controlling the GUI displayed by the television portal module;
receiving, from the OHMD, a command for controlling the GUI displayed by the television portal module; and
controlling the GUI displayed by the television portal module according to the command received from the OHMD,
wherein the GUI element comprises an image known to the OHMD to control the GUI displayed on the television portal module.

16. The method according to claim 15, wherein the command instructs the television portal module to cause one action of a set of actions in the GUI displayed by the television portal module, wherein the set of actions comprises at least one of a move action or a swipe action.

17. A computer program product comprising a non-transitory computer readable storage medium storing instructions for enabling an Optical Head Mounted Display, OHMD, to control a GUI displayed by the television portal module, the instructions when executed on a processor of a television portal module causes the television portal module to perform the method according to claim 15.

18. An Optical Head Mounted Display, OHMD, configured to control a Graphical User Interface, GUI, displayed by a television portal module, by means of detecting a movement of a head of the user or an eye of the user, wherein the television portal module further displays a GUI element for controlling the GUI, wherein the OHMD comprises a display configured to display information viewable by the user, wherein the OHMD comprises processing circuitry configured to:
capture, using a camera of the OHMD, an image of the GUI displayed by the television portal module;
determine the GUI element is present in the captured image;
control the display of the OHMD to display a sight element for aiming, by the user, at the GUI element of the GUI displayed by the television portal module in response to the determination that the GUI element is present in the captured image;
detect that the sight element is aimed at the GUI element of the GUI displayed by the television portal module; and
enter into a mode for controlling the GUI displayed by the television portal module, responsive to the detection that the sight element is aimed at the GUI element of the GUI displayed by the television portal module,
detect the movement of the head of the user or the eye of the user in response to entering into the mode for controlling the GUI displayed by the television portal module; and
send a command to the television portal module for controlling the GUI displayed by the television portal module based on the detected movement.

19. The OHMD according to claim 18, wherein the processing circuitry is further is configured to:
control the display of the OHMD, to display a menu including a command item for entering the mode for controlling the GUI; and
enter into the mode for controlling the GUI in response to a selection, by the user, of the command item.

20. The OHMD according to claim 18, wherein the processing circuitry is further configured to:
detect a wink command for entering the mode for controlling the GUI; and
enter into the mode for controlling the GUI in response to the detection of the wink command.

21. The OHMD according to claim 18, wherein the command instructs the television portal module to cause one action of a set of actions in the GUI displayed by the television portal module, wherein the set of actions comprises at least one of a move action or a swipe action.

22. The OHMD according to claim 18, wherein the processing circuitry is further configured to set the command to one action of the set of actions in a cyclic manner, when no movement of the head of the user or the eye of the user is detected during a defined time period.

23. The OHMD according to claim 18, wherein the processing circuitry is further configured to exit the mode for controlling the GUI.

24. The OHMD according to claim 23, wherein the processing circuitry is further configured to:
set the command to one action of the set of actions in a cyclic manner, when no movement of the head of the user or the eye of the user is detected during a defined time period, and
exit the mode for controlling the GUI, when the command has been set to a move action a first number of times and to a swipe action a second number of times, wherein the second number of times is equal to the first number of times.

25. The OHMD according to claim 23, wherein the processing circuitry is further is configured to:
control the display of the OHMD, to display a menu including a command item for entering the mode for controlling the GUI; and
enter into the mode for controlling the GUI in response to a selection, by the user, of the command item, and
exit the mode for controlling the GUI, in response to a selection of a release item of the menu for exiting the mode for controlling the GUI.

26. The OHMD according to claim 23, wherein the processing circuitry is further configured to:
detect a wink command for entering the mode for controlling the GUI;
enter into the mode for controlling the GUI in response to the detection of the wink command;
detect a further wink command for exiting the mode for controlling the GUI; and
exit the mode for controlling the GUI in response to detection of the further wink command.

27. The OHMD according to claim 18, wherein the sight element is aimed at the GUI element by that the user aligns the sight element with the GUI element.

28. A television portal module configured to enable an Optical Head Mounted Display, OHMD, to control a Graphical User Interface, GUI, displayed by the television portal module on a display device of the television portal module, wherein the television portal module comprises processing circuit configured to:
control the display device to display a GUI element for enabling the OHMD to enter into a mode for controlling the GUI;
receive, from the OHMD, a command for controlling the GUI displayed by the television portal module, and
control the GUI displayed by display device of the television portal module according to the command received from the OHMD,
wherein the GUI element comprises an image known to the OHMD to control the GUI displayed on the display device of the television portal module.

29. The television portal module according to claim 28, wherein the command instructs the television portal module to cause one action of a set of actions in the GUI displayed by the television portal module, wherein the set of actions comprises at least one of a move action or a swipe action.

* * * * *